(12) United States Patent
Uchida et al.

(10) Patent No.: US 9,927,684 B2
(45) Date of Patent: Mar. 27, 2018

(54) PROJECTION OPTICAL SYSTEM AND IMAGE PROJECTOR

(71) Applicant: Panasonic Intellectual Property Management Co., Ltd., Osaka (JP)

(72) Inventors: Tsuneo Uchida, Kanagawa (JP); Katsu Yamada, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/464,585

(22) Filed: Mar. 21, 2017

(65) Prior Publication Data

US 2017/0285451 A1 Oct. 5, 2017

(30) Foreign Application Priority Data

Mar. 30, 2016 (JP) .................................. 2016-068511
Jan. 5, 2017 (JP) .................................. 2017-000320

(51) Int. Cl.
*G03B 21/28* (2006.01)
*G03B 21/14* (2006.01)
(Continued)

(52) U.S. Cl.
CPC ........... *G03B 21/147* (2013.01); *G02B 13/16* (2013.01); *G02B 13/18* (2013.01); *G02B 17/08* (2013.01); *G03B 21/28* (2013.01)

(58) Field of Classification Search
CPC .. G03B 21/28; G03B 21/2066; G03B 21/208; G02B 13/16; G02B 15/14; G02B 15/15;
(Continued)

(56) References Cited

U.S. PATENT DOCUMENTS

2010/0097582 A1  4/2010 Nagase et al.
2013/0100418 A1  4/2013 Yoshikawa
(Continued)

FOREIGN PATENT DOCUMENTS

CN      103064240 A    4/2013
JP      2008-250296 A  10/2008
(Continued)

OTHER PUBLICATIONS

International Search Report of PCT application No. PCT/JP2017/009130 dated Jun. 6, 2017.

*Primary Examiner* — Sultan Chowdhury
(74) *Attorney, Agent, or Firm* — Renner Otto Boisselle & Sklar, LLP

(57) ABSTRACT

A projection optical system projects onto a projection surface an image ray bundle formed on an image display element, and includes a transmissive optical system positioned on a side of a emission surface of the image display element and having positive power, and a reflective optical system including at least one mirror for reflecting, toward the projection surface, light rays emitted from the transmissive optical system. The transmissive optical system includes at least one positive lens disposed closer to the image display element than an aperture stop, along with first and second positive lenses having a meniscus shape, and a negative lens disposed therebetween, which are closer to the projection surface than the aperture stop is. During focusing, spacing between the first positive lens and the negative lens and spacing between the second positive lens and the negative lens remain unchanged.

10 Claims, 3 Drawing Sheets

(51) Int. Cl.
*G02B 13/16* (2006.01)
*G02B 17/08* (2006.01)
*G02B 13/18* (2006.01)

(58) Field of Classification Search
CPC ...... G02B 15/20; G02B 15/163; G02B 13/18; G02B 13/22
See application file for complete search history.

(56) References Cited

U.S. PATENT DOCUMENTS

| | | | |
|---|---|---|---|
| 2013/0235356 A1 | 9/2013 | Takahashi et al. | |
| 2014/0111868 A1* | 4/2014 | Nagatoshi | G02B 15/177 359/680 |
| 2014/0204351 A1* | 7/2014 | Matsuo | G02B 13/16 353/98 |

FOREIGN PATENT DOCUMENTS

| | | |
|---|---|---|
| JP | 2011-242606 A | 12/2011 |
| JP | 2013-088727 A | 5/2013 |
| JP | 2013-174886 A | 9/2013 |

\* cited by examiner

PROJECTION OPTICAL SYSTEM AND IMAGE PROJECTOR

BACKGROUND

1. Technical Field

The present disclosure relates to a projection optical system and an image projector including the projection optical system.

2. Description of the Related Art

Unexamined Japanese Patent Publication No. 2013-174886 discloses a projector that uses a projection optical system including reflective surfaces. The projection optical system used in this projector is intended for enlarged projection of an image that is formed on a light valve onto a projection surface. The projection optical system is formed of a lens optical system having positive power for forming an intermediate image of the image between the light valve and the projection surface, a first reflective surface having positive power for reflecting a ray bundle that diverges after formation of the intermediate image and imaging the diverging ray bundle on the projection surface, and a second reflective surface for causing light rays emitted from the lens optical system to be incident on the first reflective surface, and the lens optical system is formed of a plurality of lenses. Thus, large-screen projection can be performed with chromatic aberration and distortion being reduced.

SUMMARY

A projection optical system of the present disclosure is a projection optical system for projecting onto a projection surface an image ray bundle that is formed on an image display element. The projection optical system includes a transmissive optical system and a reflective optical system. The transmissive optical system is positioned on a side of an emission surface of the image display element and has positive power. The reflective optical system includes at least one mirror and reflects, toward the projection surface, light rays emitted from the transmissive optical system. The transmissive optical system includes an aperture stop, at least one positive lens disposed closer to the image display element than the aperture stop is, a first positive lens having a meniscus shape, a negative lens, and a second positive lens having a meniscus shape, and the first positive lens, the negative lens, and the second positive lens are disposed closer to the projection surface than the aperture stop is. The first positive lens and the second positive lens are disposed so that their respective concave surfaces face each other. The negative lens is disposed between the first positive lens and the second positive lens. During focusing, a spacing between the first positive lens and the negative lens and a spacing between the second positive lens and the negative lens remain unchanged.

An image projector of the present disclosure is an image projector for projecting an image ray bundle onto a projection surface. The image projector includes an image display element, and a projection optical system. The image display element forms the image ray bundle. The projection optical system includes a transmissive optical system and a reflective optical system. The transmissive optical system is positioned on a side of an emission surface of the image display element and has positive power. The reflective optical system includes at least one mirror and reflects, toward the projection surface, light rays emitted from the transmissive optical system. The transmissive optical system includes an aperture stop, at least one positive lens disposed closer to the image display element than the aperture stop is, a first positive lens having a meniscus shape, a negative lens, and a second positive lens having a meniscus shape, and the first positive lens, the negative lens, and the second positive lens are disposed closer to the projection surface than the aperture stop is. The first positive lens and the second positive lens are disposed so that their respective concave surfaces face each other. The negative lens is disposed between the first positive lens and the second positive lens. During focusing, a spacing between the first positive lens and the negative lens and a spacing between the second positive lens and the negative lens remain unchanged.

The projection optical system of the present disclosure can reduce image distortion.

DETAILED DESCRIPTION

Exemplary embodiments are described hereinafter in detail with appropriate reference to the accompanying drawings. In some cases, detailed descriptions that are more than necessary are omitted. For example, detailed description of well-known matters and repeated description of substantially the same structure are omitted for the purpose of preventing the following description from needlessly having redundancy, thereby facilitating understanding by those skilled in the art.

It is also to be noted that the accompanying drawings and the following description are provided to allow those skilled in the art to sufficiently understand the present disclosure and thus are not intended to limit subject matters described in the claims First Exemplary Embodiment With reference to FIGS. 1 and 2, a description is provided hereinafter of image projector 10 according to the first exemplary embodiment.

Image projector 10 of the first exemplary embodiment is used, for example, in an aircraft cabin. Image projector 10 is disposed, for example, in a limited space near a baggage locker and projects an image onto a wall or a ceiling of the cabin.

Because of a configuration of projection optical system 100, image projector 10 of the first exemplary embodiment can have a lower profile and also can reduce image distortion even on a large screen. In other words, image projector 10 of the first exemplary embodiment can achieve the reduction of image distortion by means of positive lenses (first lens L1, third lens L3, and fifth lens L5) of projection optical system 100 that are disposed closer to image display element 130 than aperture stop A. A first positive lens (eleventh lens L11) having a meniscus shape, a negative lens (twelfth lens L12), and a second positive lens (thirteenth lens L13) having a meniscus shape that are disposed closer to a projection surface (screen 1) than aperture stop A also contribute to the lower profile of image projector 10 of the first exemplary embodiment and reduction of image distortion even on a large screen.

[1-1. Structure]

Figure 1:
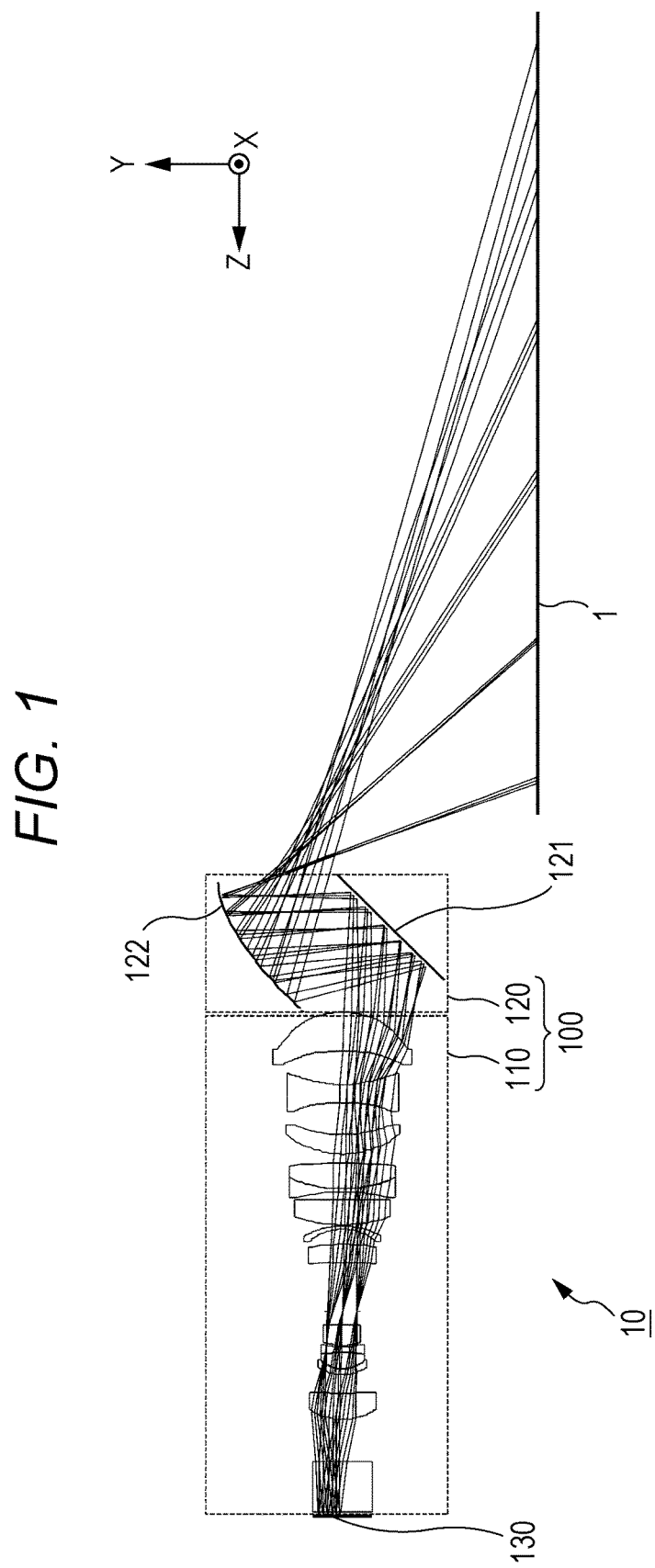
FIG. 1 illustrates a structure of an image projector according to a first, a second or a third exemplary embodiment.

As shown in FIG. 1, image projector 10 of the first exemplary embodiment is formed of projection optical system 100 and image display element 130. Projection optical system 100 includes transmissive optical system 110 that has positive power as a whole, and reflective optical system 120. Projection optical system 100 projects an image formed on image display element 130 onto screen 1 that is in a nonopposed position (oblique to projection optical system 100). The nonopposed position mentioned here is found in cases where among light rays emitted from a final surface of projection optical system 100, the light ray passing through a center of the image projected onto screen 1 has a direction that does not correspond with a direction that is normal to screen 1 through the center of the image.

Based on an image signal, image display element 130 forms a ray bundle (hereinafter referred to as the image ray bundle) of the image to be projected onto screen 1. As image display element 130, a spatial modulator such as a digital micromirror device (DMD) or a transmissive or reflective liquid crystal panel can be used. In FIG. 1, a display surface of image display element 130 of the present disclosure has long sides parallel to an X axis (perpendicular to a paper surface), and short sides parallel to a Y axis.

Figure 2:
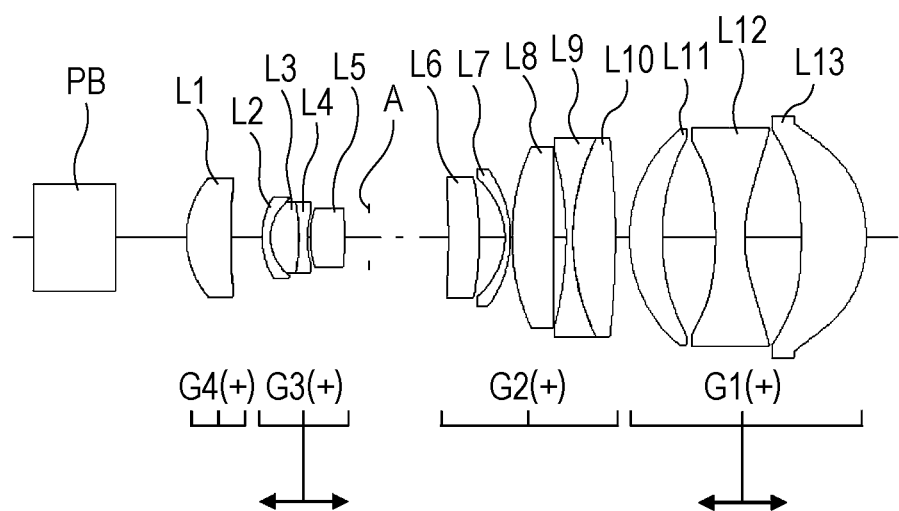
FIG. 2 illustrates a configuration of a transmissive optical system according to the first exemplary embodiment (Numerical Example 1)

As shown in FIG. 2, transmissive optical system 110 includes prism PB, aperture stop A, and first through thirteenth lenses L1 to L13. Prism PB, aperture stop A, and first through thirteenth lenses L1 to L13 are arranged between image display element 130 and screen 1.

Among first through thirteenth lenses L1 to L13, first lens L1 is disposed closest to image display element 130. Among first through thirteenth lenses L1 to L13, thirteenth lens L13 is disposed closest to screen 1. First through thirteenth lenses L1 to L13 are arranged in this order.

Prism PB is disposed between first lens L1 and image display element 130. Aperture stop A is disposed between fifth lens L5 and sixth lens L6.

A description is provided hereinafter of first through thirteenth lenses L1 to L13. In the following description, surfaces on which light from image display element 130 is incident are incident surfaces, while surfaces from which the light from image display element 130 is emitted are emission surfaces.

First through fifth lenses L1 to L5 are disposed closer to image display element 130 than aperture stop A.

First lens L1 is a meniscus-shaped lens having positive power. The incident surface of first lens L1 is convex. Some lenses of transmissive optical system 110 have the respective convex incident surfaces that face image display element 130. This means that the convex incident surface of first lens L1 faces image display element 130.

Second lens L2 is a meniscus-shaped lens having negative power. The incident surface of second lens L2 is convex. Second lens L2 is cemented to the incident surface of third lens L3.

Third lens L3 is a lens having positive power. The incident surface and the emission surface of third lens L3 are both convex.

Fourth lens L4 is a lens having negative power. The incident surface and the emission surface of fourth lens L4 are both concave. Fourth lens L4 is cemented to the emission surface of third lens L3.

Fifth lens L5 is a lens having positive power. The incident surface and the emission surface of fifth lens L5 are both convex.

Sixth through thirteenth lenses L6 to L13 are disposed closer to screen 1 than aperture stop A.

Sixth lens L6 is a meniscus-shaped lens having positive power. The emission surface of sixth lens L6 is convex. Some lenses of transmissive optical system 110 have the respective convex emission surfaces that face reflective optical system 120. This means that the convex emission surface of sixth lens L6 faces reflective optical system 120.

Seventh lens L7 is a meniscus-shaped lens having negative power. The emission surface of seventh lens L7 is convex.

Eighth lens L8 is a meniscus-shaped lens having positive power. The incident surface of eighth lens L8 is convex.

Ninth lens L9 is a lens having negative power. The incident surface and the emission surface of ninth lens L9 are both concave.

Tenth lens L10 is a lens having positive power. The incident surface and the emission surface of tenth lens L10 are both convex.

Preferably, ninth lens L9 and tenth lens L10 form a cemented lens with the emission surface of ninth lens L9 cemented to the incident surface of tenth lens L10. A low-dispersion lens is used as ninth lens L9. In the present exemplary embodiment, the lens element used as ninth lens L9 has an Abbe number that is the largest in transmissive optical system 110.

Eleventh lens L11 is a meniscus-shaped lens having positive power. The emission surface of eleventh lens L11 is concave and faces reflective optical system 120.

Twelfth lens L12 is a lens having negative power. The incident surface and the emission surface of twelfth lens L12 are both concave. At least one of the incident surface and the emission surface of this twelfth lens L12 is preferably aspheric. Specifically, it is preferable that the aspheric surface of twelfth lens L12 be such that its curvature reduces radially away from a lens center. This means that the power of twelfth lens L12 is preferably smaller in an outer border of lens L12 than it is in the center of lens L12.

Thirteenth lens L13 is a meniscus-shaped lens having positive power. The incident surface of thirteenth lens L13 is concave. This means that the concave surface of thirteenth lens L13 faces image display element 130. Thirteenth lens L13 is shaped to have a thickness deviation ratio that is the largest among the meniscus-shaped lenses included in transmissive optical system 110.

Eleventh lens L11 and thirteenth lens L13 are disposed so that their respective concave surfaces face each other. Twelfth lens L12 is disposed between eleventh lens L11 and thirteenth lens L13.

Preferably, at least one of the incident surfaces and the emission surfaces of eleventh and thirteenth lenses L11 and L13 is aspheric.

Transmissive optical system 110 of the first exemplary embodiment performs focusing by means of its two lens groups. One of the lens groups includes second lens L2, third lens L3, fourth lens L4, and fifth lens L5. These second through fifth lenses L2 to L5 are integral with one another. A spacing between fourth lens L4 and fifth lens L5 remains unchanged. The other lens group includes eleventh lens L11, twelfth lens L12, and thirteenth lens L13. These eleventh through thirteenth lenses L11 to L13 are integral with one another. A spacing between eleventh lens L11 and twelfth lens L12 and a spacing between twelfth lens L12 and thirteenth lens L13 remain unchanged. During focusing, these lens groups each move integrally.

Reflective optical system 120 reflects and projects a ray bundle emitted by transmissive optical system 110 onto screen 1. Reflective optical system 120 is formed of two mirrors, that is, first mirror 121 and second mirror 122. A reflective surface of first mirror 121 is a free-form surface. It is to be noted that the reflective optical system may be formed of at least one mirror, so that a number of mirrors is not limited to two.

An intermediate image is formed between transmissive optical system 110 and screen 1. With reference to FIGS. 1 and 2, for example, the intermediate image is formed by joining points at which light rays intersect between the emission surface of thirteenth lens L13 and a reflective surface of second mirror 122 in the first exemplary embodiment. With the formation of the intermediate image, a conjugate position of the light rays emitted from transmissive optical system 110 is separated from a position conjugate to second mirror 122 that is closest to screen 1, so that the light rays are incident on second mirror 122 at a gentle angle. This is advantageous in regards to miniaturization of reflective optical system 120.

[1-2. Effects]

In image projector 10 of the first exemplary embodiment, the positive lenses (first lens L1, third lens L3, and fifth lens L5) are disposed closer to image display element 130 than aperture stop A. Through use of these positive lenses, the light rays emitted along a direction perpendicular to the display surface of image display element 130 can be converged at aperture stop A, thus leading to reduced image distortion of the image projected onto screen 1.

In image projector 10 of the first exemplary embodiment, thirteenth lens L13 can reduce spreading of the light rays that are incident on first mirror 121. In cases where the light rays spread out when being incident on first mirror 121, first mirror 121 needs to be increased in size in a downward direction on the paper surface of FIG. 1, whereby image projector 10 is increased in size. In the first exemplary embodiment, because thirteenth lens L13 can reduce the spreading of the light rays, first mirror 121 can be positioned as close to second mirror 122 as possible. Consequently, image projector 10 can be reduced in size and can be of lower profile.

In image projector 10 of the first exemplary embodiment, the use of eleventh lens L11, twelfth lens L12, and thirteenth lens L13 can satisfactorily correct field curvature in a well-balanced manner and correct distortion of the image that is projected on screen 1.

In the first exemplary embodiment, thirteenth lens L13 disposed closer to screen 1 than twelfth lens L12 is shaped to have the largest thickness deviation ratio among the meniscus-shaped lenses included in transmissive optical system 110. Thus, thirteenth lens L13 can have an increased difference in refractive power between its center and its outer border, thereby being effective in correcting the field curvature.

In the first exemplary embodiment, a ray bundle incident on ninth lens L9 and tenth lens L10 is made larger by seventh negative meniscus-shaped lens L7, and the low-dispersion lens is used as ninth lens L9 that has the negative power and forms the cemented lens in combination with tenth lens L10. Thus, chromatic aberration of magnification can be corrected satisfactorily. It is to be noted that by having positive refractive power as a whole, the cemented lens formed of ninth lens L9 and tenth lens L10 can satisfactorily correct positive field curvature.

In the first exemplary embodiment, the lens group including second through fifth lenses L2 to L5 and the lens group including eleventh through thirteenth lenses L11 to L13 each move integrally during focusing, so that even when a projection distance changes, favorable optical performance can be satisfied.

In the first exemplary embodiment, the intermediate image is formed between transmissive optical system 110 and screen 1, whereby the image reflected by first mirror 121 and second mirror 122 has less distortion, realizing a larger screen. This means that even with a short distance between image display element 130 and screen 1, a larger screen can be achieved.

In the first exemplary embodiment, the use of transmissive optical system 110 enables miniaturization of projection optical system 100. Furthermore, the use of reflective optical system 120 in combination with transmissive optical system 110 enables steep deflection of the light rays. Thus, even with a short distance between image display element 130 and screen 1, a larger screen can be achieved.

Second Exemplary Embodiment

Figure 3:
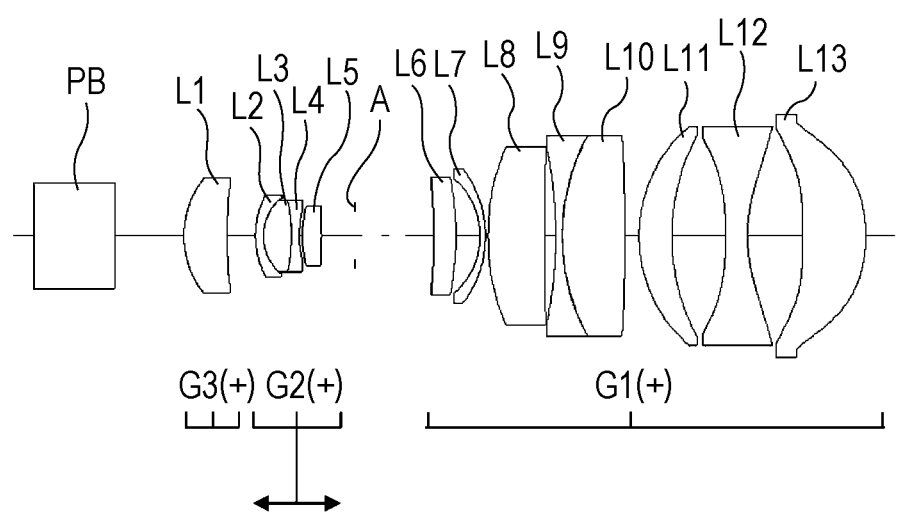
FIG. 3 illustrates a configuration of a transmissive optical system according to the second exemplary embodiment (Numerical Example 2)

With reference to FIGS. 1 and 3, a description is provided hereinafter of image projector 10 according to the second exemplary embodiment. Image projector 10 of the second exemplary embodiment is similar in basic structure to the image projector of the first exemplary embodiment, so that similar components have the same reference marks, and descriptions of those components are omitted. Moreover, first through thirteenth lenses L1 to L13 are similar in basic structure to those corresponding lenses of the first exemplary embodiment, thus having the same reference marks, and their descriptions are omitted.

[2-1. Structure]

Projection optical system 100 of the second exemplary embodiment includes transmissive optical system 110 that has positive power as a whole, and reflective optical system 120.

In the second exemplary embodiment, sixth lens L6, seventh lens L7, eighth lens L8, ninth lens L9, tenth lens L10, eleventh lens L11, twelfth lens L12, and thirteenth lens L13 are fixed in place, so that lens-to-lens spacings remain unchanged.

Transmissive optical system 110 of the second exemplary embodiment preferably performs focusing by means of at least one lens group. For example, second lens L2, third lens L3, fourth lens L4, and fifth lens L5 are integral with one another to form the lens group. As in the case of the first exemplary embodiment, second lens L2, third lens L3, and fourth lens L4 form a cemented lens, and a spacing between fourth lens L4 and fifth lens L5 remains unchanged. It is preferable that the lens group formed of these second through fifth lenses L2 to L5 move integrally for focusing, so that even when a projection distance changes, favorable optical performance can be achieved.

[2-2. Effects]

Because of the configuration of projection optical system 100, image projector 10 of the second exemplary embodiment can have a lower profile and also can reduce image distortion even on a large screen as in the case of the first exemplary embodiment.

Third Exemplary Embodiment

Figure 4:
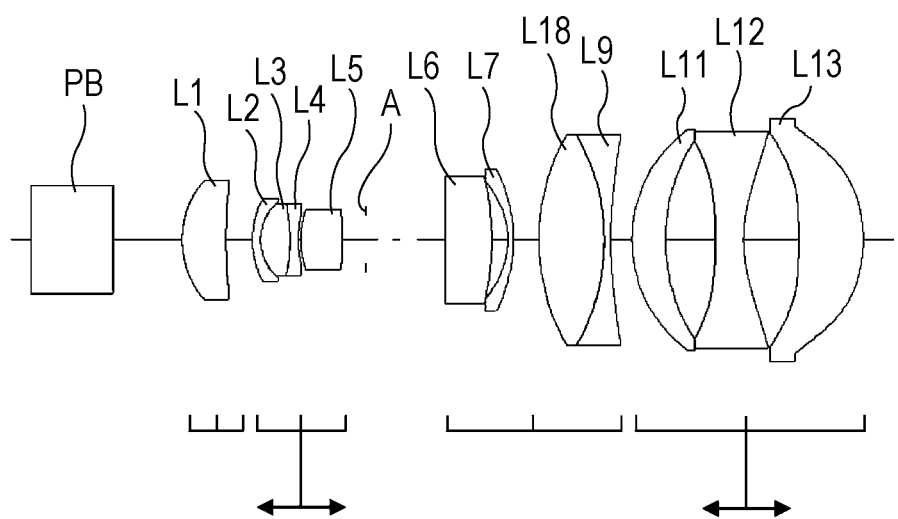
FIG. 4 illustrates a configuration of a transmissive optical system according to the third exemplary embodiment (Numerical Example 3).

With reference to FIG. 4, a description is provided hereinafter of image projector 10 according to the third exemplary embodiment. Image projector 10 of the third exemplary embodiment is similar in basic structure to the image projector of the first exemplary embodiment, so that similar components have the same reference marks, and descriptions of those components are omitted. Moreover, first through seventh lenses L1 to L7, ninth lens L9, and eleventh through thirteenth lenses L11 to L13 are similar in basic structure to those corresponding lenses of the first exemplary embodiment, thus having the same reference marks, and their descriptions are omitted.

[3-1. Structure]

Projection optical system 100 of the third exemplary embodiment includes transmissive optical system 110 that has positive power as a whole, and reflective optical system 120.

Third exemplary embodiment differs from the first exemplary embodiment in that eighteenth lens L18 shown in FIG. 4 is used in place of eighth lens L8 of FIG. 2. This means that eighteenth lens L18 is disposed between seventh lens L7 and ninth lens L9. The third exemplary embodiment differs further from the first exemplary embodiment in that tenth lens L10 is not used. This means that eleventh lens L11 is disposed next to ninth lens L9 to be closer to screen 1 than ninth lens L9.

Thus, transmissive optical system 110 of the third exemplary embodiment includes between image display element 130 and screen 1, first lens L1, second lens L2, third lens L3, fourth lens L4, fifth lens L5, sixth lens L6, seventh lens L7, eighteenth lens L18, ninth lens L9, eleventh lens L11, twelfth lens L12, and thirteenth lens L13 that are arranged in this order.

Eighteenth lens L18 is a lens having positive power. An incident surface and an emission surface of eighteenth lens L18 are both convex. Preferably, eighteenth lens L18 and ninth lens L9 form a cemented lens with the emission surface of eighteenth lens L18 cemented to an incident surface of ninth lens L9. It is to be noted that a low-dispersion lens is used as ninth lens L9 having negative power. In the present exemplary embodiment, the lens element used as ninth lens L9 has an Abbe number that is the largest in transmissive optical system 110. The cemented lens formed of eighteenth lens L18 and ninth lens L9 has positive refractive power as a whole.

Transmissive optical system 110 performs focusing by means of its two lens groups. One of the lens groups includes second through fifth lenses L2 to L5. These second through fifth lenses L2 to L5 are integral with one another. The other lens group includes eleventh lens L11, twelfth lens L12, and thirteenth lens L13. These eleventh through thirteenth lenses L11 to L13 are integral with one another. During focusing, these lens groups each move integrally, so that even when a projection distance changes, favorable optical performance can be satisfied.

[3-2. Effects]

Because of the configuration of projection optical system 100, image projector 10 of the third exemplary embodiment can have a lower profile and also can reduce image distortion even on a large screen as in the case of the first exemplary embodiment.

In the third exemplary embodiment, a ray bundle incident on eighteenth lens L18 and ninth lens L9 is made larger by seventh negative meniscus-shaped lens L7, and ninth lens L9 having the negative power is the low-dispersion lens for use in the cemented lens. Thus, chromatic aberration can be corrected satisfactorily by that cemented lens. It is to be noted that by having the positive refractive power as a whole, the cemented lens formed of eighteenth lens L18 and ninth lens L9 can satisfactorily correct positive field curvature.

A description is provided hereinafter of conditions preferably met by, for example, projection optical systems 100 of the first through third exemplary embodiments. While the plurality of preferable conditions is specified to be met by projection optical systems 100 of the first through third exemplary embodiments, it is most preferable that all of the plurality of conditions is met. However, in cases where the conditions are met individually, any projection optical systems having corresponding effects can be obtained.

In projection optical system 100 of each of the first through third exemplary embodiments, between the positive meniscus-shaped lenses (eleventh lens L11 and thirteenth lens L13) that are disposed so that their respective concave surfaces face each other, the lens (eleventh lens L11) that is closer to image display element 130 is preferably chosen to meet the following condition (1-1):

$$1<|(R2+R1)/(R2-R1)|<10 \quad (1\text{-}1)$$

where R1 is a radius of curvature of one of the surfaces of the lens disposed closer to the image display element, and R2 is a radius of curvature of the other surface of the lens disposed closer to the image display element.

Meeting this condition effects correction of field curvature on the projection surface (screen 1) while effecting reduction of distortion aberration to an appropriate quantity.

The above effects can be more successful when the following condition (1-2) is met.

$$3<|(R2+R1)/(R2-R1)|<8 \quad (1\text{-}2)$$

Table 1 shows corresponding values in each of the conditional expressions that are calculated for respective projection optical systems of Numerical Examples 1 to 3. It is to be noted that the corresponding value is a value of (R2+R1)/(R2−R1).

(Corresponding Values in Conditional Expression)

TABLE 1

|  | Numerical Example 1 | Numerical Example 2 | Numerical Example 3 |
|---|---|---|---|
| Conditional Expression (1) | 5.12470 | 1.08733 | 7.02124 |

A description is provided hereinafter of Numerical Examples 1 to 3 in which projection optical systems 100 of the above exemplary embodiments are embodied. In Numerical Examples 1 to 3, all lengths are in the unit of "mm", and all angles of view are in the unit of "°" in tables. In Numerical Examples 1 to 3, "r" is a radius of curvature, "d" is a surface-to-surface spacing, "nd" is a refractive index at the D-line, and "vd" is an Abbe number with respect to the D-line. In Numerical Examples 1 to 3, surfaces marked with "*" are aspheric, and a shape of the aspheric surface is defined by the following expression:

$$Z = \frac{h^2/r}{1+\sqrt{1-(1+\kappa)(h/r)^2}} + \sum A_n h^n \quad \text{[Expression 1]}$$

where, Z is a distance between a point on the aspheric surface having height h from an optical axis and a tangent plane to the aspheric surface at a vertex of the aspheric surface, h is a height from the optical axis, r is a vertex radius of curvature, κ is a conic constant, and An is an n-th order aspheric coefficient.

It is to be noted that aspheric coefficients shown are only those coefficients when those other than conic constant κ are not zero. In lens group data, each lens group has a length that is a spacing between its first surface and its final surface, a front principal point positioned at a distance from its first surface, and a back principal point positioned at a distance from its first surface.

NUMERICAL EXAMPLE 1

Specific data of a transmissive optical system of Numerical Example 1 are shown in Data 1 to Data 5 below. The transmissive optical system of Numerical Example 1 corresponds to transmissive optical system 110 (FIG. 2) of the first exemplary embodiment.

In Data 1, surface number 1 represents the incident surface of prism PB of FIG. 2, and surface number 2 represents the emission surface of prism PB. Surface number 3 represents the incident surface of first lens L1, and surface number 4 represents the emission surface of first lens L1. Surface number 5 represents the incident surface of second lens L2, surface number 6 represents a cemented surface between second lens L2 and third lens L3, surface number 7 represents a cemented surface between third lens L3 and fourth lens L4, and surface number 8 represents the emission surface of fourth lens L4. Surface number 9 represents the incident surface of fifth lens L5, and surface number 10 represents the emission surface of fifth lens L5. Surface number 11 represents aperture stop A. Surface number 12 represents the incident surface of sixth lens L6, and surface number 13 represents the emission surface of sixth lens L6. Surface number 14 represents the incident surface of seventh lens L7, and surface number 15 represents the emission surface of seventh lens L7. Surface number 16 represents the incident surface of eighth lens L8, and surface number 17 represents the emission surface of eighth lens L8. Surface number 18 represents the incident surface of ninth lens L9, surface number 19 represents a cemented surface between ninth lens L9 and tenth lens L10, and surface number 20 represents the emission surface of tenth lens L10. Surface number 21 represents the incident surface of eleventh lens L11, and surface number 22 represents the emission surface of eleventh lens L11. Surface number 23 represents the incident surface of twelfth lens L12, and surface number 24 represents the emission surface of twelfth lens L12. Surface number 25 represents the incident surface of thirteenth lens L13, and surface number 26 represents the emission surface of thirteenth lens L13.

Surface numbers in Data 2 are the same as the surface numbers of Data 1.

In Data 4, lens 1 corresponds to prism PB, and lenses 2 to 14 correspond to first through thirteenth lenses L1 to L13, respectively.

In Data 5, lens group 1 corresponds to first lens L1, lens group 2 corresponds to second through fifth lenses L2 to L5, lens group 3 corresponds to sixth through tenth lenses L6 to L10, and lens group 4 corresponds to eleventh through thirteenth lenses L11 to L13.

[Data 1]

| Surface data | | | | | |
|---|---|---|---|---|---|
| Surface number | r | d | nd | vd | Effective diameter |
| Image display element | | ∞ | | | |
| 1 | ∞ | 14.99500 | 1.51680 | 64.2 | |
| 2 | ∞ | 12.72300 | | | |
| 3* | 17.23400 | 8.00300 | 1.59349 | 67.0 | |
| 4* | 315.80500 | Variable | | | 15.904 |
| 5 | 14.22900 | 1.50000 | 2.00069 | 25.5 | |

| Surface data (continued) | | | | | |
|---|---|---|---|---|---|
| Surface number | r | d | nd | vd | Effective diameter |
| 6 | 8.67800 | 5.15000 | 1.49700 | 81.6 | |
| 7 | −34.20000 | 1.49900 | 1.90366 | 31.3 | |
| 8 | 19.05500 | 0.49900 | | | |
| 9 | 16.72300 | 6.17600 | 1.84666 | 23.8 | 4.690 |
| 10 | −156.51000 | Variable | | | |
| 11 (Aperture) | ∞ | 14.49000 | | | 4.365 |
| 12 | −120.75700 | 5.57200 | 1.78472 | 25.7 | |
| 13 | −56.17000 | 4.58500 | | | |
| 14 | −13.97000 | 1.00400 | 1.91082 | 35.2 | |
| 15 | −21.26300 | 0.29600 | | | |
| 16 | 40.92700 | 7.46700 | 1.72342 | 38.0 | |
| 17 | −1962.27200 | 2.30200 | | | |
| 18 | −60.74800 | 1.19800 | 1.49700 | 81.6 | |
| 19 | 39.71400 | 7.66800 | 1.63854 | 55.4 | |
| 20 | −168.43100 | Variable | | | |
| 21 | 25.80000 | 5.91200 | 1.78590 | 43.9 | |
| 22 | 38.31000 | 9.60800 | | | |
| 23* | −53.54700 | 5.23500 | 1.68893 | 31.1 | 21.794 |
| 24* | 24.57000 | 10.18400 | | | 24.740 |
| 25* | −187.91700 | 11.83400 | 1.53775 | 74.7 | 21.205 |
| 26* | −25.79200 | | | | 21.794 |

[Data 2]
Aspheric Surface Data
Surface Number 3
K=−6.09400E−02, A4=1.98117E−05, A6=1.56997E−08, A8=−4.62804E−10
A10=−1.19399E−13, A12=8.76682E−15, A14=−2.09485E−16, A16=2.51704E−18

Surface Number 4
K=−1.00000E+02, A4=4.71492E−05, A6=1.33281E−07, A8=−5.51156E−10
A10=−1.55150E−11, A12=−2.25085E−14, A14=2.52558E−15, A16=−7.77899E−18

Surface Number 23
K=1.11067E+00, A4=6.33930E−06, A6=−2.59108E−07, A8=9.71178E−10
A10=−1.04904E−12, A12=−2.26872E−16, A14=−1.58698E−19, A16=1.77042E−21

Surface Number 24
K=−1.66300E−02, A4=−4.34030E−05, A6=3.86699E−08, A8=−1.80419E−11
A10=−1.24012E−13, A12=1.25649E−16, A14=1.87457E−19, A16=−5.10267E−22

Surface Number 25
K=−9.41608E+01, A4=−4.67773E−05, A6=−2.01376E−07, A8=1.51882E−09
A10=−2.50674E−12, A12=−1.46260E−16, A14=1.84046E−19, A16=4.28649E−21

Surface Number 26
K=−2.08200E−02, A4=−1.69368E−05, A6=−5.91673E−08, A8=1.07391E−10
A10=1.23694E−13, A12=−2.06773E−16, A14=−2.43725E−20, A16=8.16055E−22

[Data 3]

| Various data | | | |
|---|---|---|---|
| Projection area | 80″ | 100″ | 50″ |
| Focal length | 37.3470 | 37.3021 | 37.4561 |
| d4 | 5.6380 | 5.4328 | 6.2488 |

-continued

| Various data | | | |
|---|---|---|---|
| Projection area | 80" | 100" | 50" |
| d10 | 4.3540 | 4.5571 | 3.7411 |
| d20 | 2.6040 | 2.8223 | 1.5986 |

[Data 4]

| Single lens data | | |
|---|---|---|
| Lens | Start surface | Focal length |
| 1 | 1 | ∞ |
| 2 | 3 | 30.4108 |
| 3 | 5 | −25.7030 |
| 4 | 6 | 14.5054 |
| 5 | 7 | −13.3631 |
| 6 | 9 | 18.1415 |
| 7 | 12 | 128.9402 |
| 8 | 14 | −47.8583 |
| 9 | 16 | 55.5055 |
| 10 | 18 | −48.1287 |
| 11 | 19 | 51.0611 |
| 12 | 21 | 83.2253 |
| 13 | 23 | −23.7961 |
| 14 | 25 | 54.2093 |

[Data 5]

| Lens group data | | | | |
|---|---|---|---|---|
| GROUP | Start surface | Focal length | Lens group length | Front principal point position | Back principal point position |
| 1 | 1 | 30.41079 | 35.72100 | 22.32193 | 30.46131 |
| 2 | 5 | 75.30926 | 14.82400 | 0.46045 | 5.86471 |
| 3 | 11 | 219.36841 | 44.58200 | 31.27514 | 40.72933 |
| 4 | 21 | 717.01958 | 42.77300 | 138.60457 | 153.67075 |

NUMERICAL EXAMPLE 2

Specific data of a transmissive optical system of Numerical Example 2 are shown in Data 6 to Data 9 below. The transmissive optical system of Numerical Example 2 corresponds to transmissive optical system 110 (FIG. 3) of the second exemplary embodiment.

Surface numbers in Data 6 represent the same surfaces as the surface numbers of Data 1.

Surface numbers in Data 7 are the same as the surface numbers of Data 6.

Lens numbers in Data 9 represent the same lenses as the lens numbers of Data 4.

[Data 6]

| Surface data | | | | | |
|---|---|---|---|---|---|
| Surface number | r | d | nd | vd | Effective diameter |
| Image display element | | ∞ | | | |
| 1 | ∞ | 15.00000 | 1.51680 | 64.2 | |
| 2 | ∞ | 12.66300 | | | |
| 3* | 17.19300 | 8.00000 | 1.59349 | 67.0 | |
| 4* | 290.32200 | 5.10600 | | | 12.510 |
| 5 | 14.48000 | 1.50000 | 2.00069 | 25.5 | |
| 6 | 8.78200 | 5.08500 | 1.49700 | 81.6 | |
| 7 | −32.37200 | 1.50000 | 1.90366 | 31.3 | |
| 8 | 19.67100 | 0.50000 | | | |
| 9 | 17.21600 | 3.54300 | 1.84666 | 23.8 | 4.696 |
| 10 | −122.74800 | 6.15600 | | | |
| 11 (Aperture) | ∞ | 14.49800 | | | 4.330 |
| 12 | −93.48000 | 4.07700 | 1.78472 | 25.7 | |
| 13 | −52.70900 | 4.39600 | | | |
| 14 | −13.56800 | 1.00000 | 1.91082 | 35.2 | |
| 15 | −19.77000 | 0.50000 | | | |
| 16 | 40.73100 | 10.43500 | 1.72342 | 38.0 | |
| 17 | 973.57600 | 1.96300 | | | |
| 18 | −77.44100 | 1.20000 | 1.49700 | 81.6 | |
| 19 | 36.71000 | 11.51300 | 1.63854 | 55.4 | |
| 20 | −342.73900 | 2.60000 | | | |
| 21 | 25.66400 | 6.04000 | 1.78590 | 43.9 | |
| 22 | 37.83000 | 9.89400 | | | |
| 23* | −55.70200 | 3.94100 | 1.68893 | 31.1 | 21.756 |
| 24* | 24.47000 | 10.21300 | | | 24.476 |
| 25* | −210.37000 | 11.57500 | 1.53775 | 74.7 | 20.668 |
| 26* | −25.63500 | | | | 21.756 |

[Data 7]

Aspheric Surface Data

Surface Number 3

$K=-6.04699E-02$, $A4=1.98616E-05$, $A6=7.35058E-09$, $A8=-5.05794E-10$ $A10=8.61968E-13$, $A12=1.71901E-14$, $A14=-2.36028E-16$, $A16=2.18449E-18$

Surface Number 4

$K=-1.00000E+02$, $A4=4.69902E-05$, $A6=1.18022E-07$, $A8=-5.22552E-10$ $A10=-1.47332E-11$, $A12=2.91990E-15$, $A14=2.91462E-15$, $A16=-1.40152E-17$

Surface Number 23

$K=9.17327E-01$, $A4=6.73643E-06$, $A6=-2.61030E-07$, $A8=9.70513E-10$ $A10=-1.04173E-12$, $A12=-2.23528E-16$, $A14=-2.05136E-19$, $A16=1.76480E-21$

Surface Number 24

$K=-8.76498E-03$, $A4=-4.37627E-05$, $A6=4.02825E-08$, $A8=-1.52276E-11$ $A10=-1.22414E-13$, $A12=1.22226E-16$, $A14=1.72616E-19$, $A16=-5.04200E-22$

Surface Number 25

$K=-1.00000E+02$, $A4=-4.72581E-05$, $A6=-2.01657E-07$, $A8=1.52205E-09$ $A10=-2.49780E-12$, $A12=-1.19138E-16$, $A14=2.16018E-19$, $A16=4.21484E-21$

Surface Number 26

$K=-1.08792E-02$, $A4=-1.70130E-05$, $A6=-6.04647E-08$, $A8=1.04246E-10$ $A10=1.35513E-13$, $A12=-1.79293E-16$, $A14=-1.16542E-21$, $A16=8.03042E-22$

[Data 8]

Various Data

Focal length 38.1700

[Data 9]

Single lens data

| Lens | Start surface | Focal length |
|---|---|---|
| 1 | 1 | ∞ |
| 2 | 3 | 30.4604 |
| 3 | 5 | −25.6835 |
| 4 | 6 | 14.4940 |
| 5 | 7 | −13.3576 |
| 6 | 9 | 18.0422 |
| 7 | 12 | 147.5199 |
| 8 | 14 | −51.4384 |
| 9 | 16 | 58.4874 |
| 10 | 18 | −49.9354 |
| 11 | 19 | 52.5497 |
| 12 | 21 | 83.3357 |
| 13 | 23 | −24.1927 |
| 14 | 25 | 53.1220 |

NUMERICAL EXAMPLE 3

Specific data of a transmissive optical system of Numerical Example 3 are shown in Data 10 to Data 14 below. The transmissive optical system of Numerical Example 3 corresponds to transmissive optical system 110 (FIG. 4) of the third exemplary embodiment.

Surface numbers 1 to 15 in Data 10 represent the same surfaces as surface numbers 1 to 15 of Data 1. In Data 10, surface number 16 represents the incident surface of eighteenth lens L18, surface number 17 represents a cemented surface between eighteenth lens L18 and ninth lens L9, and surface number 18 represents the emission surface of ninth lens L9. Surface number 19 represents the incident surface of eleventh lens L11, and surface number 20 represents the emission surface of eleventh lens L11. Surface number 21 represents the incident surface of twelfth lens L12, and surface number 22 represents the emission surface of twelfth lens L12. Surface number 23 represents the incident surface of thirteenth lens L13, and surface number 24 represents the emission surface of thirteenth lens L13.

Surface numbers in Data 11 are the same as the surface numbers of Data 10.

In Data 13, lens 1 corresponds to prism PB, and lenses 2 to 8 correspond to first through seventh lenses L1 to L7, respectively. Lens 9 corresponds to eighteenth lens L18. Lens 10 corresponds to ninth lens L9. Lenses 11 to 13 correspond to eleventh through thirteenth lenses L11 to L13, respectively.

In Data 14, lens group 1 corresponds to first lens L1, lens group 2 corresponds to second through fifth lenses L2 to L5, and lens group 3 corresponds to sixth lens L6, seventh lens L7, eighteenth lens L18, and ninth lens L9. Lens group 4 corresponds to eleventh through thirteenth lenses L11 to L13.

[Data 10]

Surface data

| Surface number | r | d | nd | vd | Effective diameter |
|---|---|---|---|---|---|
| Image display element | ∞ | | | | |
| 1 | ∞ | 15.00000 | 1.51680 | 64.2 | |
| 2 | ∞ | 12.46900 | | | |
| 3* | 16.60900 | 8.00000 | 1.59349 | 67.0 | |
| 4* | 238.82100 | Variable | | | 15.490 |
| 5 | 15.08000 | 1.50000 | 2.00069 | 25.5 | |
| 6 | 8.82500 | 5.31000 | 1.49700 | 81.6 | |
| 7 | −29.89700 | 1.50000 | 1.90366 | 31.3 | |
| 8 | 18.82700 | 0.50000 | | | |
| 9 | 17.07700 | 7.44700 | 1.92119 | 24.0 | 4.680 |
| 10 | −120.94700 | Variable | | | |
| 11 (Aperture) | ∞ | 14.62800 | | | 4.382 |
| 12 | −303.76700 | 8.37600 | 1.75211 | 25.0 | |
| 13 | −46.44600 | 2.92800 | | | |
| 14 | −15.10700 | 1.00000 | 1.91082 | 35.2 | |
| 15 | −27.46200 | 4.63100 | | | |
| 16 | 37.26600 | 11.91600 | 1.63854 | 55.4 | |
| 17 | −37.26600 | 1.20000 | 1.49700 | 81.6 | |
| 18 | 90.86800 | Variable | | | |
| 19 | 24.13000 | 6.09300 | 1.74400 | 44.8 | |
| 20 | 32.14500 | 9.13600 | | | |
| 21* | −65.96100 | 5.10000 | 1.68893 | 31.1 | 21.227 |
| 22* | 24.63500 | 9.98500 | | | 20.654 |
| 23* | −271.41000 | 11.80000 | 1.52500 | 70.3 | 21.801 |
| 24* | −26.13800 | | | | 21.801 |

[Data 11]
Aspheric Surface Data
  Surface Number 3
  K=−2.64764E−02, A4=1.95203E−05, A6=2.77906E−08, A8=−5.48222E−10
  A10=1.45564E−12, A12=2.44601E−14, A14=−2.53264E−16, A16=2.83945E−18
  Surface Number 4
  K=−1.00000E+02, A4=5.09253E−05, A6=1.64368E−07, A8=−2.22116E−10
  A10=−1.70214E−11, A12=−6.77176E−15, A14=3.59876E−15, A16=−1.22797E−17
  Surface Number 21
  K=4.24168E−01, A4=7.35890E−06, A6=−2.63924E−07, A8=9.63867E−10
  A10=−1.04909E−12, A12=−2.43452E−16, A14=−2.45190E−19, A16=2.11315E−21
  Surface Number 22
  K=9.83767E−03, A4=−4.47000E−05, A6=4.34712E−08, A8=−8.91954E−12
  A10=−1.22273E−13, A12=9.34976E−17, A14=8.60890E−20, A16=−5.31655E−22
  Surface Number 23
  K=−1.11269E+02, A4=−5.01495E−05, A6=−2.02921E−07, A8=1.52178E−09
  A10=−2.49636E−12, A12=−1.24985E−16, A14=1.70196E−19, A16=3.87907E−21
  Surface Number 24
  K=−1.91793E−03, A4=−1.75117E−05, A6=−6.08590E−08, A8=1.03604E−10
  A10=1.48543E−13, A12=−1.59856E−16, A14=−3.66014E−20, A16=6.50430E−22

[Data 12]

Various data

| Projection area | 80" | 100" | 50" |
|---|---|---|---|
| Focal length | 37.9403 | 37.8961 | 38.0889 |
| d4 | 4.8310 | 4.6458 | 5.4573 |

-continued

| Various data | | | |
|---|---|---|---|
| Projection area | 80" | 100" | 50" |
| d10 | 4.3410 | 4.5260 | 3.7171 |
| d18 | 3.8260 | 4.0665 | 2.9391 |

[Data 13]

| Single lens data | | |
|---|---|---|
| Lens | Start surface | Focal length |
| 1 | 1 | ∞ |
| 2 | 3 | 29.6789 |
| 3 | 5 | −24.1589 |
| 4 | 6 | 14.3637 |
| 5 | 7 | −12.5997 |
| 6 | 9 | 16.6758 |
| 7 | 12 | 71.8962 |
| 8 | 14 | −38.3461 |
| 9 | 16 | 31.1194 |
| 10 | 17 | −53.0099 |
| 11 | 19 | 98.2208 |
| 12 | 21 | −25.4504 |
| 13 | 23 | 54.1942 |

[Data 14]

| Lens group data | | | | |
|---|---|---|---|---|
| GROUP | Start surface | Focal length | Lens group length | Front principal point position | Back principal point position |
| 1 | 1 | 29.67893 | 35.46900 | 21.98797 | 30.14473 |
| 2 | 5 | 75.48370 | 16.25700 | 3.10935 | 9.06057 |
| 3 | 11 | 213.83645 | 44.67900 | 33.85084 | 43.49828 |
| 4 | 19 | 834.01525 | 42.11400 | 161.64749 | 183.52380 |

Other Exemplary Embodiments

The first through third exemplary embodiments have been described above as being illustrative of technique disclosed in the present application but are not restrictive of the technique of the present disclosure. The technique of the present disclosure is also applicable to exemplary embodiments including appropriate modifications, replacements, additions, and omissions. Moreover, the components described in the first through third exemplary embodiments can be combined in a new exemplary embodiment.

Because the above exemplary embodiments are intended to be illustrative of the technique of the present disclosure, various modifications, replacements, additions, omissions, and others can be made within the scope of the claims or equivalents of the claims The present disclosure can be applied for projection of an image displayed on an image display element. Specifically, the present disclosure is applicable to, for example, a projector and a head-up display.

What is claimed is:

1. A projection optical system for projecting onto a projection surface an image ray bundle formed on an image display element, the projection optical system comprising: a transmissive optical system positioned on a side of an emission surface of the image display element, the transmissive optical system having positive power; and a reflective optical system including at least one mirror for reflecting, toward the projection surface, light rays emitted from the transmissive optical system, wherein the transmissive optical system includes: an aperture stop; at least one positive lens disposed closer to the image display element than the aperture stop is; a first positive lens having a meniscus shape, the first positive lens being disposed closer to the projection surface than the aperture stop is; a negative lens disposed closer to the projection surface than the aperture stop is; and a second positive lens having a meniscus shape, the second positive lens being disposed closer to the projection surface than the aperture stop is, the first positive lens and the second positive lens are disposed so that a concave surface of the first positive lens and a concave surface of the second positive lens face each other, the negative lens is disposed between the first positive lens and the second positive lens, and during focusing, a spacing between the first positive lens and the negative lens and a spacing between the second positive lens and the negative lens remain unchanged.

2. The projection optical system according to claim 1, wherein
an incident surface and an emission surface of the negative lens are concave.

3. The projection optical system according to claim 1, wherein
the negative lens has an aspheric shape.

4. The projection optical system according to claim 3, wherein
the shape of the negative lens is such that curvature reduces radially away from a center of the negative lens.

5. The projection optical system according to claim 1, wherein
of the first positive lens and the second positive lens, a lens closer to the image display element satisfies the following condition (1):

$$1<|(R2+R1)/(R2-R1)|<10 \qquad (1)$$

where R1 is a radius of curvature of a surface of the lens disposed closer to the image display element, and R2 is a radius of curvature of an opposite surface of the lens disposed closer to the image display element.

6. The projection optical system according to claim 1, wherein
at least one of the first positive lens and the second positive lens has an aspheric shape.

7. The projection optical system according to claim 1, wherein
the transmissive optical system further includes a negative low-dispersion lens disposed closer to the projection surface than the aperture stop is.

8. The projection optical system according to claim 1, wherein the transmissive optical system further includes a meniscus-shaped lens group including the first positive lens and the second positive lens, and a lens of the meniscus-shaped lens group having a largest thickness deviation ratio in the meniscus-shaped lens group, is disposed closer to the projection surface than the negative lens is.

9. The projection optical system according to claim 1, wherein
an intermediate image is formed between the transmissive optical system and the projection surface.

10. An image projector for projecting an image ray bundle onto a projection surface,
the image projector comprising:
an image display element that forms the image ray bundle; and a projection optical system that includes
- a transmissive optical system positioned on a side of an emission surface of the image display element, the transmissive optical system having positive power, and
- a reflective optical system including at least one mirror for reflecting, toward the projection surface, light rays emitted from the transmissive optical system, wherein the transmissive optical system includes:
- an aperture stop;
- at least one positive lens disposed closer to the image display element than the aperture stop is;
- a first positive lens having a meniscus shape, the first positive lens being disposed closer to the projection surface than the aperture stop is;
- a negative lens disposed closer to the projection surface than the aperture stop is; and
- a second positive lens having a meniscus shape, the second positive lens being disposed closer to the projection surface than the aperture stop is, the first positive lens and the second positive lens are disposed so that a concave surface of the first positive lens and a concave surface of the second positive lens face each other, the negative lens is disposed between the first positive lens and the second positive lens, and during focusing, a spacing between the first positive lens and the negative lens and a spacing between the second positive lens and the negative lens remain unchanged.

\* \* \* \* \*